United States Patent
Awan et al.

(10) Patent No.: US 7,760,865 B2
(45) Date of Patent: Jul. 20, 2010

(54) ESCALATION FROM A CONVERSATION TO A CONFERENCE

(75) Inventors: Muhammad Aatif Awan, Bellevue, WA (US); Vinit C. Deshpande, Woodinville, WA (US); Arulkumar Elumalai, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/561,008

(22) Filed: Nov. 17, 2006

(65) Prior Publication Data

US 2008/0120381 A1 May 22, 2008

(51) Int. Cl.
*H04M 3/42* (2006.01)

(52) U.S. Cl. .......................... 379/202.01; 379/212.01; 370/62

(58) Field of Classification Search ................. 370/229, 370/296, 352, 356, 62, 202, 200; 709/204; 348/15–16; 379/202.01, 212.01
See application file for complete search history.

(56) References Cited

U.S. PATENT DOCUMENTS

| | | | |
|---|---|---|---|
| 5,291,548 A | | 3/1994 | Tsumura et al. |
| 5,563,882 A | * | 10/1996 | Bruno et al. ............. 370/260 |
| 5,625,407 A | * | 4/1997 | Biggs et al. ............. 348/14.11 |
| 5,903,629 A | | 5/1999 | Campbell, IV et al. |
| 6,545,697 B1 | * | 4/2003 | Parker et al. ............. 348/14.01 |
| 6,608,820 B1 | | 8/2003 | Bradshaw, Jr. |
| 6,754,322 B1 | | 6/2004 | Bushnell |
| 6,772,436 B1 | | 8/2004 | Doganata et al. |
| 6,895,086 B2 | | 5/2005 | Martin |
| 7,003,086 B1 | * | 2/2006 | Shaffer et al. ........... 379/202.01 |
| 7,058,168 B1 | | 6/2006 | Knappe et al. |
| 2003/0026214 A1 | | 2/2003 | Iveland et al. |
| 2003/0126207 A1 | * | 7/2003 | Creamer et al. ............. 709/204 |
| 2004/0202303 A1 | | 10/2004 | Costa-Requena et al. |
| 2005/0047389 A1 | | 3/2005 | Bond et al. |
| 2006/0010200 A1 | | 1/2006 | Mousseau et al. |
| 2007/0086446 A1 | * | 4/2007 | Denny et al. ................. 370/356 |
| 2007/0115925 A1 | * | 5/2007 | Sachnoff ..................... 370/352 |
| 2007/0127374 A1 | * | 6/2007 | Black ......................... 370/229 |
| 2007/0203982 A1 | * | 8/2007 | Jagoe et al. ................. 709/204 |

FOREIGN PATENT DOCUMENTS

WO    WO0174041    10/2001

(Continued)

OTHER PUBLICATIONS

3Com® IP Conferencing and Presence Modules, 3Com Corporation, 2006, <http://www.3com.com/other/pdfs/products/en_US/3com_400867.pdf#search=%22adding%20participant%20SIP%20conferencing%20audio%20video%20%22instant%20messaging%22%22>, last accessed on Nov. 17, 2006, 2 pages.

(Continued)

*Primary Examiner*—Curtis Kuntz
*Assistant Examiner*—Phung-Hoang J Nguyen
(74) *Attorney, Agent, or Firm*—Turocy & Watson, LLP

(57) ABSTRACT

Conversations between two parties are seamlessly and transparently escalated into a conversation between multi-parties with minimal user interaction. If the two initial parties are joined to a central focus and a media, a third or more participant is invited to join the conversation. If either of the two initial parties fails to join the focus or media, the original conversation is restored and the attempt to escalate to a conference is abandoned.

9 Claims, 10 Drawing Sheets

FOREIGN PATENT DOCUMENTS

WO    WO2006006897    1/2006

OTHER PUBLICATIONS

Cisco Unified Videoconferencing, Cisco Systems, Inc, 1992, <http://www.cisco.com/en/US/products/hw/video/ps1870/products_data_sheet0900aecd804bbfb0.html> last accessed on Nov. 17, 2006, 7 pages.

Johnathan Lennox, et al, A Protocol for Reliable Decentralized Conferencing, ACM Press, 2003, <http://portal.acm.org/citation.cfm?id=776322.776335&dl=portal&dl=ACM&type=series&idx=776322&part=Proceedings&WantType=Proceedings&title=International%20Workshop%20on%20Network%20and%20Operating%20System%20Support%20for%20Digital%20Audio%20and%20Video&CFID=11111111&CFTOKEN=2222222> last accessed on Nov. 17, 2006, 10 pages.

Kundan Singh et al, Comprehensive Multi-platform Collaboration, Department of Computer Science, Columbia University, <http://www.cs.columbia.edu/techreports/cucs-027-03.pdf> last accessed Nov. 17, 2006, 36 pages.

* cited by examiner

ESCALATION FROM A CONVERSATION TO A CONFERENCE

BACKGROUND

Conversations between two parties and conferences among multiple parties are desirable because both communication types allow the participating parties to communicate without requiring them to travel to the same location. Thus, both time and money are saved by communicating in such a manner. Conversations between two parties occur frequently and adding a new person to this conversation and creating a "conference call" is known. In such cases solutions have been developed, such as manually placing this conversation on hold and then starting a conversation with a different person and then merging the two conversations. This is the scenario likely in the telephony scenario as well.

Such solutions, however, are tedious and require multiple steps that must be performed in a certain sequence in order for a conversion to escalate into a successful conference. In addition, if the first call that is placed on hold is lost or the connection broken, the steps of placing the new call on hold and starting the original conversation again must be followed. Such tedious and redundant steps, as well as potential loss of the original conversation, can lead to frustration and wasted time and resources.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with escalating a conversation between two parties into a multi-party conference call with minimal user interaction. The parties to the conversation are provided a simple one-step process of starting or joining a conference and the underlying elements to achieve the escalation result are transparent to the users. In such a manner, escalation to a conference is performed seamlessly. In addition, if a failure occurs whereby an original party to a conversation is not successfully included in the conference, the communication between the original parties is restored.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
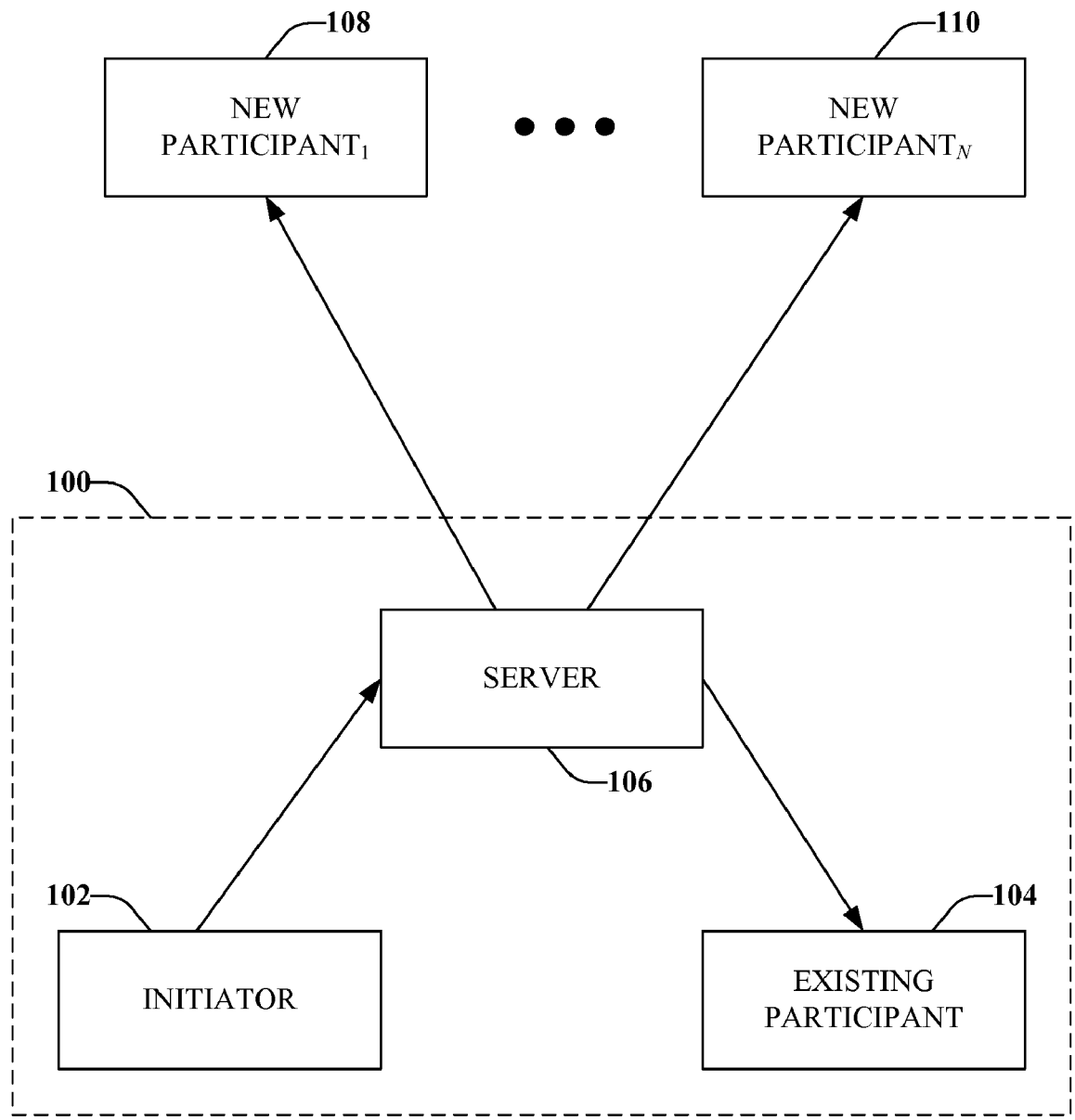
FIG. 1 illustrates a schematic representation of an exemplary peer-to-peer conversation with an escalation to a conference having three or more participants.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a schematic representation of an exemplary peer-to-peer conversation with an escalation to a conference having three or more participants. Escalation is the process of moving from a two-party conversation (peer-to-peer) to a multi-party conference. Escalation can be from a single mode conversation to a conference, from a multi-modal conversation to a conference, or escalation of conversations involving Private Branch Exchange/Public Switched Telecommunications Network (PBX/PSTN). Single mode refers to a conversation that is using only one type or means to communicate, such as video, Voice over Internet Protocol (VOIP), audio, Instant Messenger, or another type of communication. Multi-modal refers to two parties involved in a conversation using a combination of communication means, such as Video and either one of VOIP or Instant Messenger, or a combination of all three, or any combination or subset or these or other types of communication.

A conversation is a communication between two parties that is a peer-to-peer conversation, which is illustrated by dotted line 100. An initiator 102 is the participant in a conversation who adds a new member or party to the conversation. As illustrated, the initiator 102 is in a conversation 100 with an existing participant 104. A server 106 facilitates the communication transfer between the initiator 102 and the existing participant 104. This configuration can be referred to as a client-server-client configuration.

During the conversation, either participant 102, 104 may decide that one or more other participants, illustrated as "New Participant$_1$" 108 and "New Participant$_N$," 110 where N is an integer greater to or equal to one, should be added to the conversation. The addition of the one or more new participants 108, 110 can be facilitated by migrating the initiator 102 and the existing party to a conference focus associated with the server 106. Upon successful joining of the initiator 102 and existing participant 104 to the conference focus, the one or more new participants 108, 110 can join the focus and the conversation is seamlessly migrated into a conference.

If either the initiator 102 or the existing participant 104 does not successfully join the conference focus associated with the server 106, the attempt to escalate into a conference is aborted and the conversation is reinstated. Thus, the original conversation is not lost. In some embodiments, if either the initiator 102 or the existing participant 104 does not successfully join the media, the conversation is not escalated into a conference but reverts to the conversation between the initiator 102 and the existing participant 104. In such a manner, the peer-to-peer conversation is not lost in the event of a failure.

Figure 2:
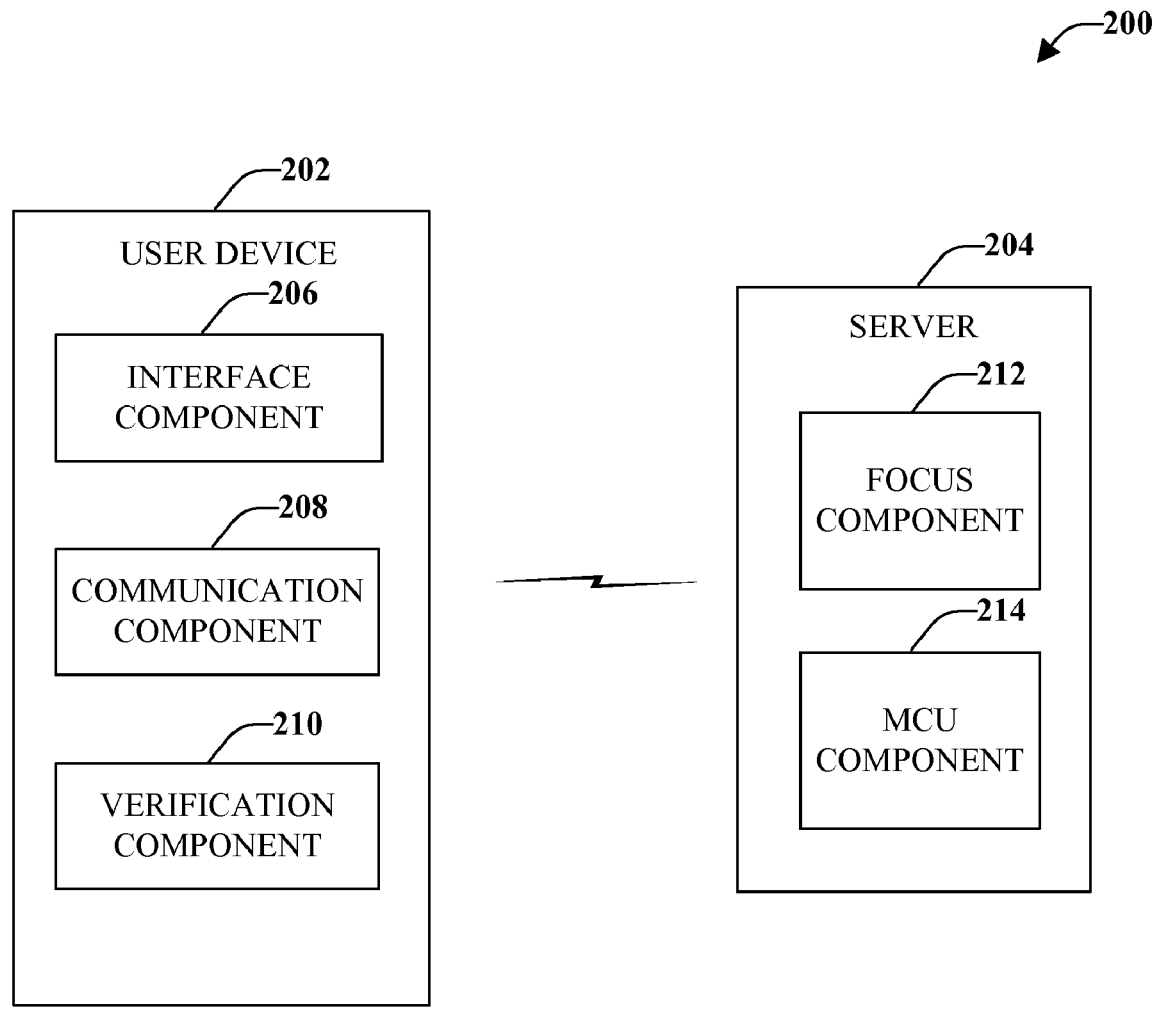
FIG. 2 illustrates a system for seamlessly escalating a two-party conversation to a multi-party conference.

FIG. 2 illustrates a system 200 for seamlessly escalating a two-party conversation to a multi-party conference. System 200 can be configured to provide conferencing based on a central focus where each participant is connected to a central conference manager that controls the entire conference. System 200 seamlessly moves a conversation between two parties to the focus and then adds at least a third person to focus. Further, system 200 can be configured to mitigate the occurrence that the conversation between the two original participants is not lost if a failure occurs in the escalation process.

System 200 includes a user device 202 and a server 204 that are in wired or wireless communication. It should be understood that system 200 can include more than one user device 202, however, only one device is shown for simplicity. It should also be understood that one or more component or function of user device 202 can alternatively or in addition be associated with the server 204.

User device 202 includes an interface component 206 that provides a means for a user to interact with device 202 and include participants in a conference. Exemplary interface components 206 will be described below with reference to FIGS. 3 and 4. The user device 202 can provide a graphical user interface (GUI), a command line interface, a speech interface, Natural Language text interface, and the like. For example, a GUI can be rendered that provides a user with a region or means to load, import, select, read, etc. the one or more participants and can include a region to present the results of invitations and other information regarding the participants. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed. For example, the user can interact with the one or more participants by entering the information into an edit control.

The user can also interact with the participants to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

A communication component 208 can also be associated with user device 202 to provide communication between the device 202, server 204, and one or more other devices (not shown). For example, communication component 208 can be a transmitter, a receiver, or both a transmitter and a receiver. Communication component 206 can be configured to send messages to server 204 that include participants to be added to a conference, a media that each participant should join in order to be included in the conference, and other information regarding the conference parameter. Communication component 208 can further be configured to receive information from the server 204 regarding the status of an escalation from a conversation to a conference. Further information that can be received by communication component 208 includes participant information, such as whether a particular participant has been sent an invitation to join a conference, if the invitations was accepted or denied, if a media was successfully joined by a particular participant, and so forth.

A verification component 210 can be associated with user device 202 to verify whether a particular participant has successfully joined a conference. Such successfully joining can include whether the existing participant of a peer-to-peer communication has joined the conference. If the existing participant has not successfully joined, the conference is aborted and the original conversation is reestablished. In this manner the conversation between the two original participants is not lost if a failure occurs during escalation. Verification component 210 can further be configured to verify whether a media was joined by a particular participant to facilitate communication during the conference.

Server 204 includes a focus component 212 and an MCU component 214 that facilitate seamless escalation from a conversation to a conference. The focus component 204 is a central focus that is configured to allow each participant to be connected to a central conference manager that controls the conference. The MCU component 214 can be, for example, an AV MCU that controls VOIP/video conferencing. In some embodiments, the MCU component 214 can be an IM MCU that is utilized when instant messaging applications are utilized.

For example, a first participant and second participant are in a single mode conversation and realize that they need to invite a third party. One of the participants would select the third party to invite. The system 200 autonomously creates a focus based conference and the first and second participants escalate to the conference and the third party is invited to the conference.

In another example, a first participant and second participant are in an audio/video and instant message session and want to invite a third party. One of the participants would select the third party to invite. System 200 autonomously creates a focus based conference and escalates the first participant and second participant to the conference. System 200 further invites the third party to join the conference. The audio/video and instant message mode are persisted seamlessly.

Another example includes a first and a second party using an instant message application to complement a phone conversation and they want to add a third party. System 200 creates a focus based conference and invites the first and second parties, who accept the invitation. The first party dials and adds the third party to the call. Each party continues to receive audio through PBX and system 200 seamlessly escalates the instant message application to all three parties. In a further example, if the first and second parties are in a PBX call including video and the first party adds the third party to the conversation. The first and second parties receive a message indicating that the PBX call will be dropped and they are escalated to an AV conference through the focus.

Figure 3:
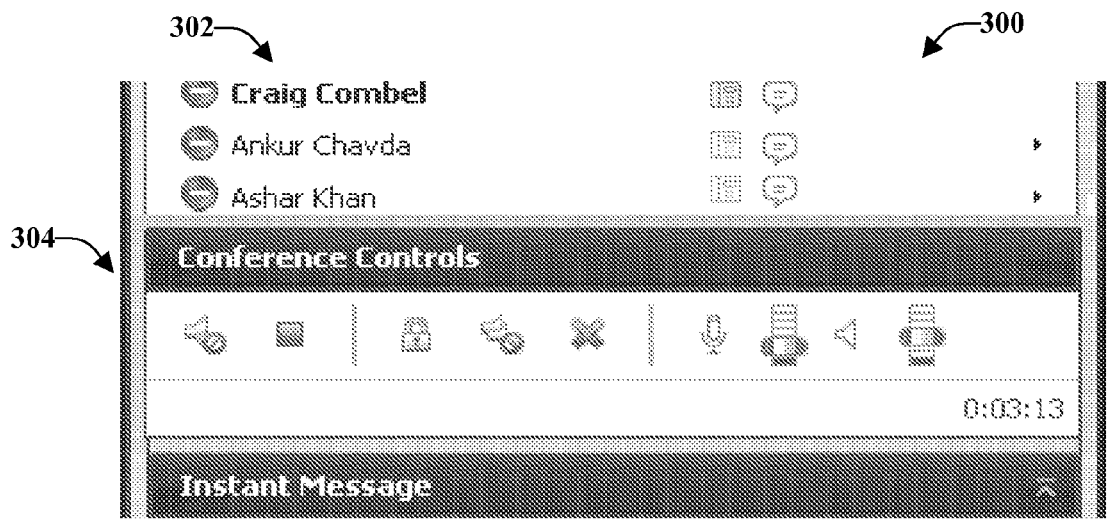
FIG. 3 illustrates an exemplary user interface that facilitates seamless escalation of a two-party conversation to a multiple-party conference.

FIG. 3 illustrates an exemplary user interface 300 that facilitates escalation of a two-party conversation to a multiple-party conference. The user interface 300 provides a seamless escalation that is transparent to the participants, wherein the communication is escalated with minimal user interaction. User interface 300 can include a listing of contacts or associates 302 from which a user can chose participants to add to a conference. Also provided can be conference controls 304, which can include, for example, a sound component that allows a sound to be heard and can be selectively enabled or disabled. Also included can be a microphone component that allows a user to communicate with the other participants in a conference. Other conference controls 304 than those shown can be provided, such as a video component, as well as other components that facilitate communication among the participants.

Figure 4:
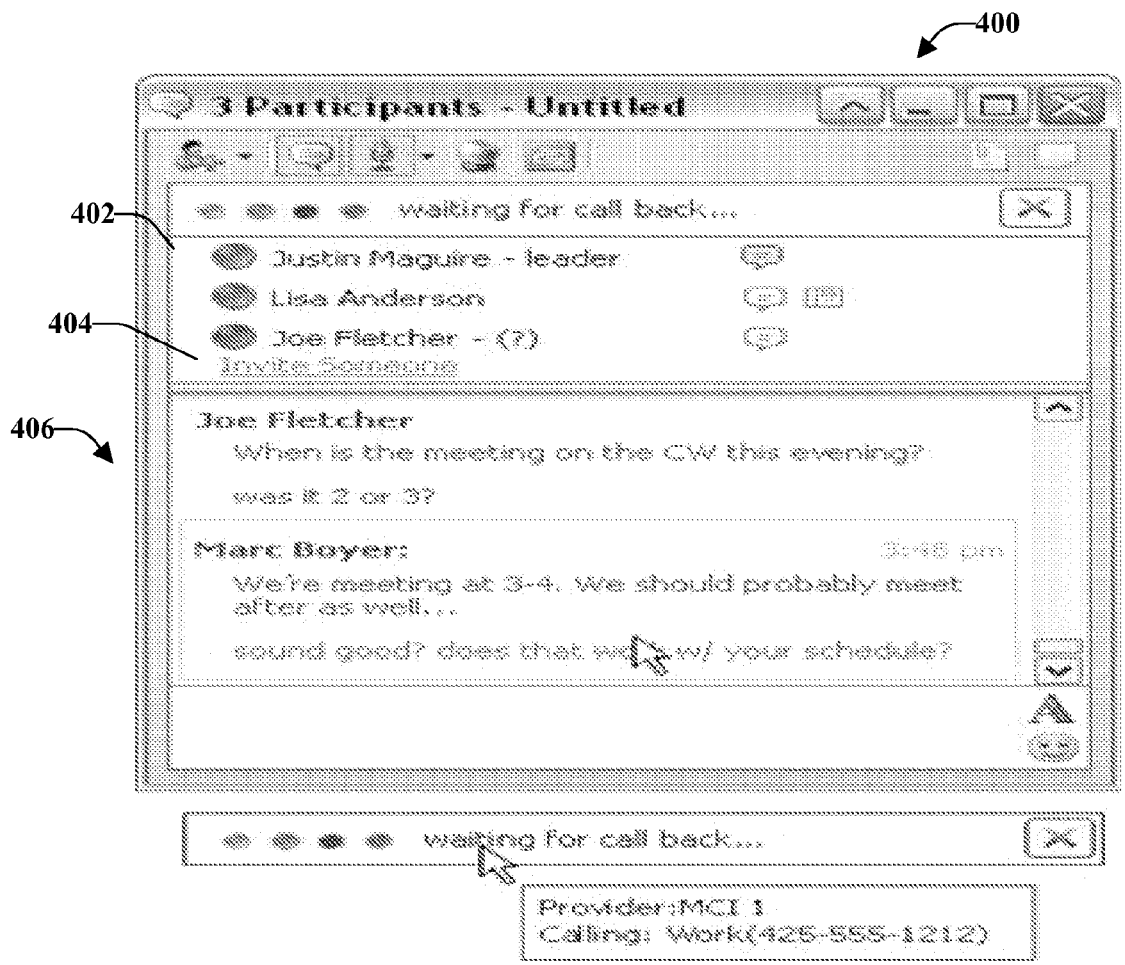
FIG. 4 illustrates another exemplary user interface that facilitates seamless escalation of a two-party conversation to a multiple-party conference.

FIG. 4 illustrates another exemplary user interface 400 that facilitates seamless escalation of a two-party conversation to a multiple-party conference. As illustrated, a listing of current participants 402 can be provided, as well as information regarding each participant. The information can include whether a current participant is in active communication (e.g., talking, sending a message, entering text, playing a video, and so forth). Also provided is a selection to add another participant 404 to the conversation, which initiates the seamless escalation from a conversation to a conference. It should be understood that the user interface 400 displays a conference having three participants rather than a conversation among two participants, thus escalation has already occurred and the information regarding the conference is displayed.

The lower section of the user interface 400 provides a display area 406 that allows a user to view various information regarding the conversation and/or conference communication. Also presented can be information regarding one or more participant. For example, such information can include whether a participant was sent an invitation to join a conference, whether a participant accepted or denied the invitation, and so forth.

The user experience, from the perspective of the initiator is that the initiator clicks on a user interface entry point to invite a new party to join the conference. A list of contacts can be presented to the initiator and one or more participants are selected, such as by highlighting the one or more contacts to add and clicking or selecting an "OK" or "Accept" button on a display screen. The initiator's roster can be updated with the newly added (selected) participants. Invitations are sent to the existing participant and the one or more new participants to join the conference. Notifications of invitations being sent may be presented to the initiator in the conversation window or display screen. The existing participant and any newly invited participants receive the invitation to join the conference, which can be individually accepted or denied. The initiator is notified of invitations being accepted. If the existing party and one or more newly added participant accepted the invitation, a conference is formed and the initiator continues the communication with all participants that accepted the invitation. If the existing participant does not accept the invitation, the escalation to a conference is aborted and the communication continues between the initiator and the existing party only. Additional attempts may be made to escalate the conversation into a conference.

Figure 5:
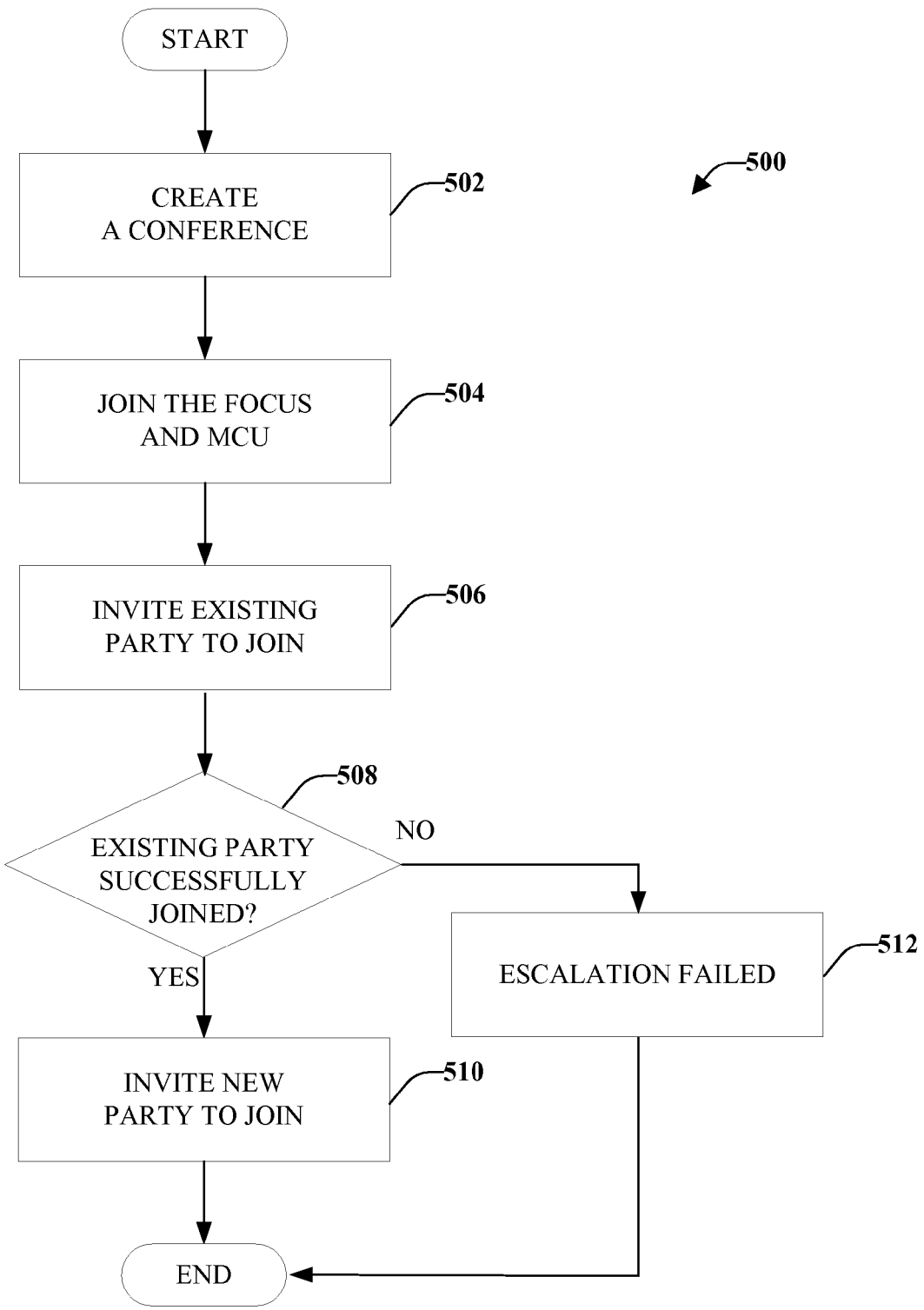
FIG. 5 illustrates a methodology for seamless escalation from a conversation to a conference.

FIG. 5 illustrates a methodology 500 for seamless escalation from a conversation to a conference. While, for purposes of simplicity of explanation, the methodologies are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 500 starts at 502 where a conference is created by an initiator. The initiator can create the conference by selecting one or more participants to be included in the conference. Such selection can be facilitated by selecting the one or more participants from a listing of contacts from a drop down list, for example. At 504, the initiator joins the focus and the MCU, which can be an MCU for the particular type of media (e.g., instant messenger, audio, video, text, and so forth) that each participant should communicate through. The media can include one or more media type, all media types, or a subset of the media types.

At substantially the same time as the initiator has successfully joined the focus and media, an invitation is sent, at 506, to the existing participant of the conversation to join the conference and media. The existing participant can accept the invitation by selecting "okay" or though another type of interface means. At 508, a determination is made where the existing party successfully joined the conference and media within a predetermined interval of time. If the existing participant successfully joins the media and conference ("YES"), an invitation is sent to new participants, at 510, inviting those participants to join the media. If it is determined that the existing party did not successfully join either the media or the conference, at 508, or does not accept within a predetermined interval ("NO"), the escalation failed. The escalation to a conference is automatically cancelled and new participants are not invited to join, at 510. The conversation is restored and, in order to escalate to a conference, the method 500 can be started again, at 502.

Figure 6:
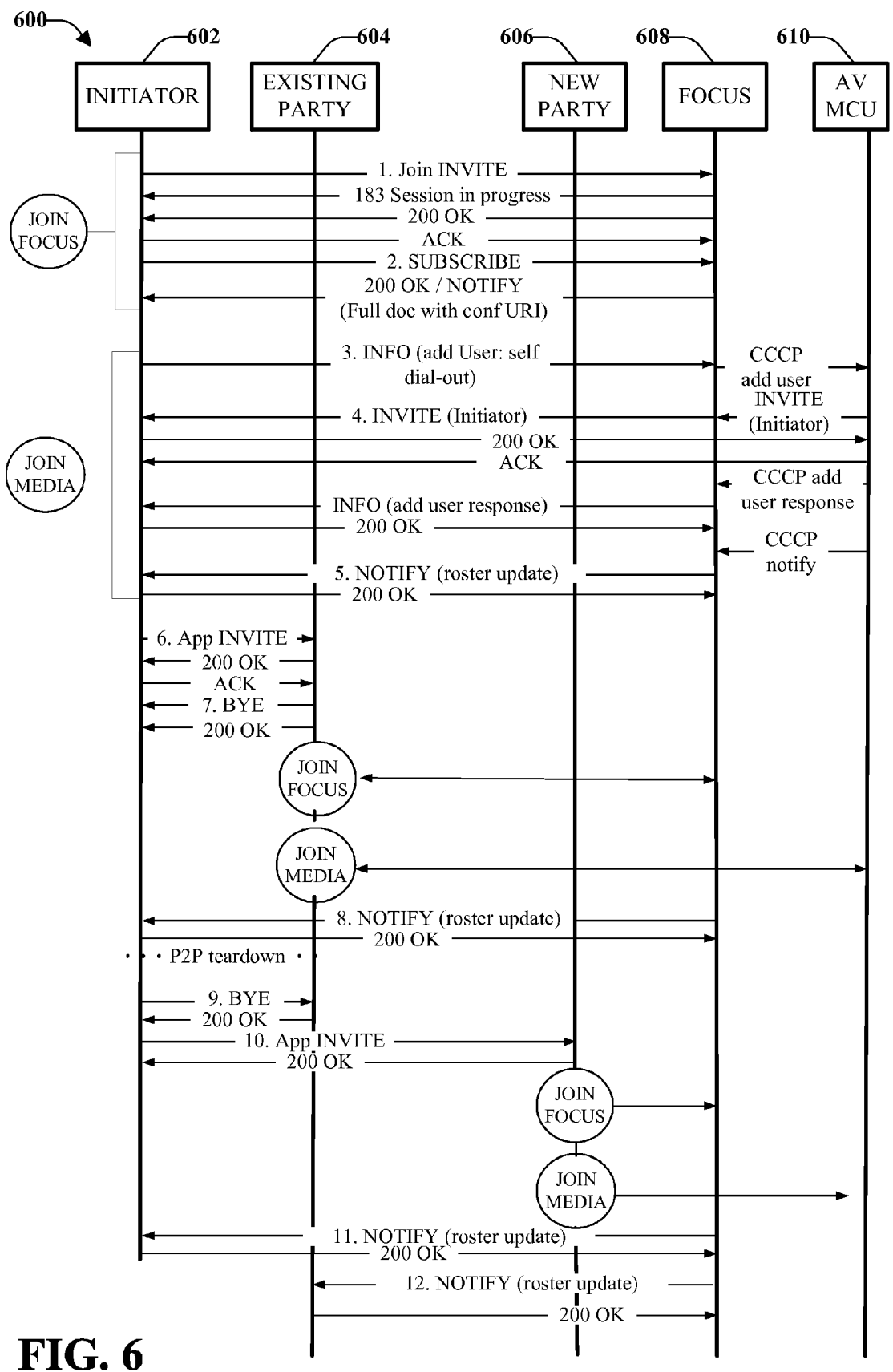
FIG. 6 illustrates a call flow diagram for escalating a single mode conversation to a single mode conference.

FIG. 6 illustrates a call flow diagram 600 for escalating a single mode conversation to a single mode conference. A first participant, using a device referred to as an initiator device 602, and a second participant, using a device referred to as an existing party device 604, can be in a one-on-one conversation and a single mode of conversation (e.g., video, VOIP, and so forth) is being used. The single mode conversation is escalated to a single mode conference though a focus and an MCU, such as an AV MCU.

The initiator 602 can seamlessly add one or more new participants, using one or more new party devices 606, to join a conversation already in process between the first participant and the existing participant. The first participant (or the participant that will add the new parties) simply selects a new participant to add to the conference through a single selection of one or more new party from a user interface device as discuss above.

The initiator device 602 creates an ad-hoc conference by making a web service call to schedule a conference and receives a response from the web server with the conferencing URI. The initiator device 602 can join the first participant the conferencing focus, shown at 608, by sending a Join_INVITE to the focus 608. The focus 608 sends an 183 Session in progress to let the initiator device 602 know the request was received. The focus 608 allocates the necessary resources on all MCUs (shown as AV MCU 610) for the conference and sends an 200 OK to the initiator device 602. A reply acknowledgment (ACK) is sent by initiator device 602 in response.

Next the initiator device 602 subscribes to the conference state by sending a SUBSCRIBE to the focus 608. A response 200 OK is sent by the focus 608 in reply and included in the body of the 200 OK is a conference document with the conference URI. At substantially the same time as receiving the 200 OK, the initiator device 602 autonomously puts the current peer-to-peer session (between first participant and second participant) on hold. The initiator device 602 has successfully joined the first participant to the focus 608.

Next the initiator device 602 joins the media, shown at 612, by sending INFORMATION that includes an ADD_USER with dial out=Self to the focus 608. The focus 608 sends a CCCP command to the MCU 610 asking it to add the user (initiator) to the media. The MCU 610 dials out to the initiator device 602 by sending an AV Invite. The initiator device 602 responds with a 200 OK and the MCU 610 acknowledges (ACK) that the response is received successfully. The MCU 610 sends a CCCP add user response to the focus 608 and INFORMATION that includes the add user response is sent to the initiator device 602, which replies with a 200 OK. The initiator-focus handshake is completed.

The MCU 610 can send a CCCP notify to the focus 608, which updates the roster from the MCU 610 to the initiator 602 by sending a NOTIFY, which can be an SIP Notify. A 200 OK reply is sent to the focus 608. Next the initiator device 602 invites the existing party device 604 to the conference by sending an app-INVITE to the existing party device 604. The app-INVITE can include the URI and the mode to which the existing party device 604 should join. The app-INVITE can also include the conversation identification of the conversion window associated with the peer-to-peer conversation.

The existing party device 604 joins the conference (focus 608) and media (MCU 610) using the same methodology the initiator device used. The focus 608 notifies the initiator device 602 that the existing party device 604 (and second participant) has joined the conference by sending a 200 OK that includes the conference document in its body. The existing party device 604 and the initiator device 602 receive an updated roster. The peer-to-peer session is torn down when the initiator device 602 sends a BYE to the existing party device 604, which replies with an OK.

The initiator device 602 invites the new party device 606 to join the conference with an App Invite. The new party device joins the conference and media. It should be noted that all the above actions can be performed autonomously by the devices. In some embodiments, one or more action can be performed manually, such as the first participant (or initiator) adding one or more other participants.

Figure 7:
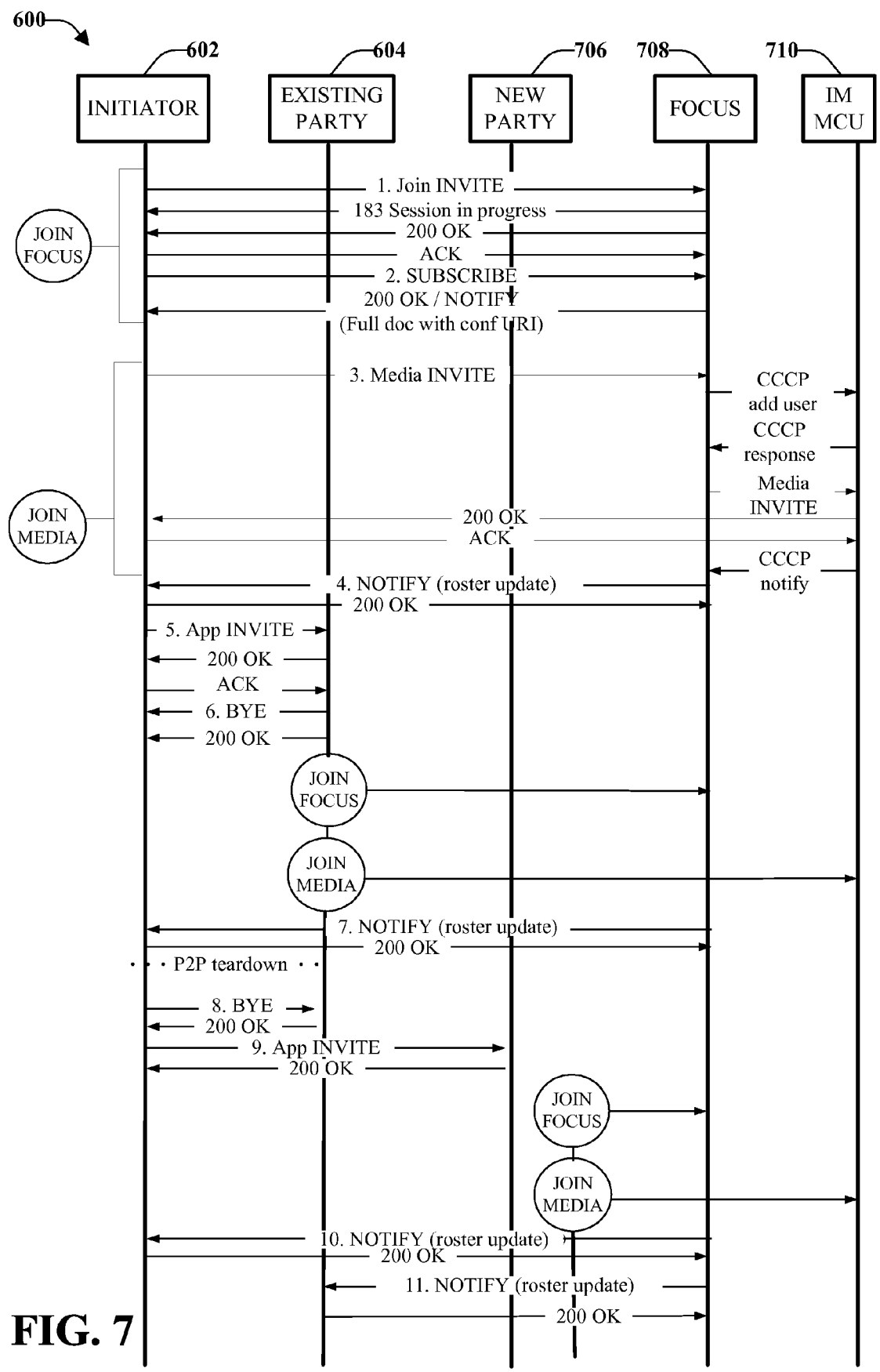
FIG. 7 illustrates another call flow diagram for escalating a single mode conversation to a single mode conference.

FIG. 7 illustrates another call flow diagram 700 for escalating a single mode conversation to a single mode conference. An initiator or first participant and an existing party or second participant are in a one-on-one conversation and a single mode of conversation (e.g., VOIP, instant messaging, and so forth) is being used. The single mode conversation is escalated to a single mode conference though interactions between an initiator device 702, an existing party device, 704, one or more new party devices 706, a focus 708, and an MCU, such as an IM MCU 710.

The diagram 700 represents escalation of an instant messaging conversation and is similar to the diagram shown in FIG. 6. However, the differences are in the logic flow, not in the user experience. That is to say, the user does not detect a difference when escalating a conversation to a conference. The points of differences are that the client joins the IM MCU 710 instead of the AV MCU 710 and the client joins the MCU using a media INVITE instead of using add_user, dialing out to self.

In the logic flow of the FIG. 6, participants join the AV MCU 610 by performing a dial out to self. This dial out is not implemented in the logic flow 700 of FIG. 7. Therefore, the participant devices 702, 704, 706 join the IM MCU 710 by sending a media invite. In addition, the peer-to-peer session is not put on hold while the escalation is in progress.

The following will briefly illustrate the aspects of the logic flow. First initiator device 702 invokes the user entry point to add the new participant (through new participant device 706) to join the conference and creates an Ad-hoc conference. Initiator device 702 joins the conferencing focus 706 and subscribes to the conferences state. Next the initiator device 702 joins the media which includes sending an INVITE to the focus 706. The focus 706 adds the user (initiator device 702)

to the MCU 708 and forwards the media INVITE to the IM MCU 708. The MCU completes the handshake with the initiator device 702.

The initiator device 702 invites the existing party device 706 to the conference and the existing party device 706 joins the conference using the same methodology as the initiator device 702. The focus 708 notifies the initiator device 702 that the existing party device 704 has joined the conference. The peer-to-peer session is torn down by the initiator device 702. The new party device 706 is invited to join the conference. If accepted, the new party joins the conference and media. The focus 706 notifies the initiator device 702 and the existing party device 704 that the new party device 706 has joined the conference.

In some embodiments, multi-modal escalation is provided, which is an extension of the single mode escalations shown and described above with a few differences in special behaviors. For example, the app INVITE to the existing party device and the new party device has a list of modes that the existing party device and new party device should join. The existing party device and the new party device join all the MCUs for the modes listed in the app INVITE. The initiator device receives a notification for each MCU that a given party device joins. On receiving these notifications, the initiator device makes additional checks to verify that the existing party device and the new party device have joined the appropriate MCUs.

The logic flow for the multi-modal escalation (not shown) starts where the initiator adds the new party to join the conference and creates and Ad-hoc conference. The initiator joins the conferencing focus and subscribes to the conference state. The current peer-to-peer session is put on hold. The initiator joins the AV MCU by dialing out to self and joins the IM MCU by sending a media INVITE.

The initiator device invites the existing party device to the conference by sending an app INVITE that contains information on what modes should be successfully escalated and what modes are optional. The existing party device joins the focus and joins the AV MCU by dialing out to self. The initiator device receives a notification that the existing party device has joined the AV MCU. The initiator device can further check to determine that the existing party device has joined the modes that should be escalated. The existing party device joins the IM MCU by sending a media INVITE and the initiator device receives a notification when the existing party device has joined the IM MCU. Tear down of the peer-to-peer session occurs. The new party device is invited by the initiator device to join the conference. The new party joins the conference, AV MCU and IM MCU, through respective new party device, using a similar methodology used by the initiator to join.

In accordance with some embodiments is a two-party conversation escalation into a multi-party conversation through the focus for communication, such as instant messenger and/or Video. A new party is manually added to the conference as a three-way call. Escalation is for applications, such as instant messenger and/or video, through the focus. Inclusion of a new party to the RCC mode involves the initiator explicitly calling the third party and adding the party to the call through the conference. The initiator and the existing party are in a peer-to-peer conversation. Multiple-modes of conversation are being used and one of the modes of conversations is a PBX call.

The user (initiator) clicks or selects an option to invite a new party to join the conference. A list of contacts is presented to the user and the user selects one or more participants and accepts such participants. The initiator's roster is updated with the newly added participants. The existing party and the one or more new parties are sent an invitation to join the conference for the media being used. Notifications of invitations being sent are presented to the initiator in the conversation window, for example. The existing party and any new parties receive the invite to join and each party selectively accepts or denies the invitation. The initiator is notified of the invitations being accepted. The initiator can select the new party, such as by right clicking with the mouse on the name, and calls the phone. The new party is now included in the three-way call.

The initiator invites the new party to join the conference and creates an Ad-hoc conference. The initiator joins the conferencing focus and subscribes to the conference state. The current peer-to-peer session is placed on hold by the initiator device for the media being used. The initiator joins the media and invites the existing party to the conference. The existing party joins the conference and media using a methodology similar to that as used by the initiator to join. The peer-to-peer session is torn down.

Next, the initiator invites the new party to join the conference. The new party joins the conference and media and the focus notifies the initiator and the existing party that the new party has joined the conference. The initiator invites the new party to the PBX conference and the new party accepts the call on the phone. The new party is now a participant in the multi-modal conference.

Figure 8:
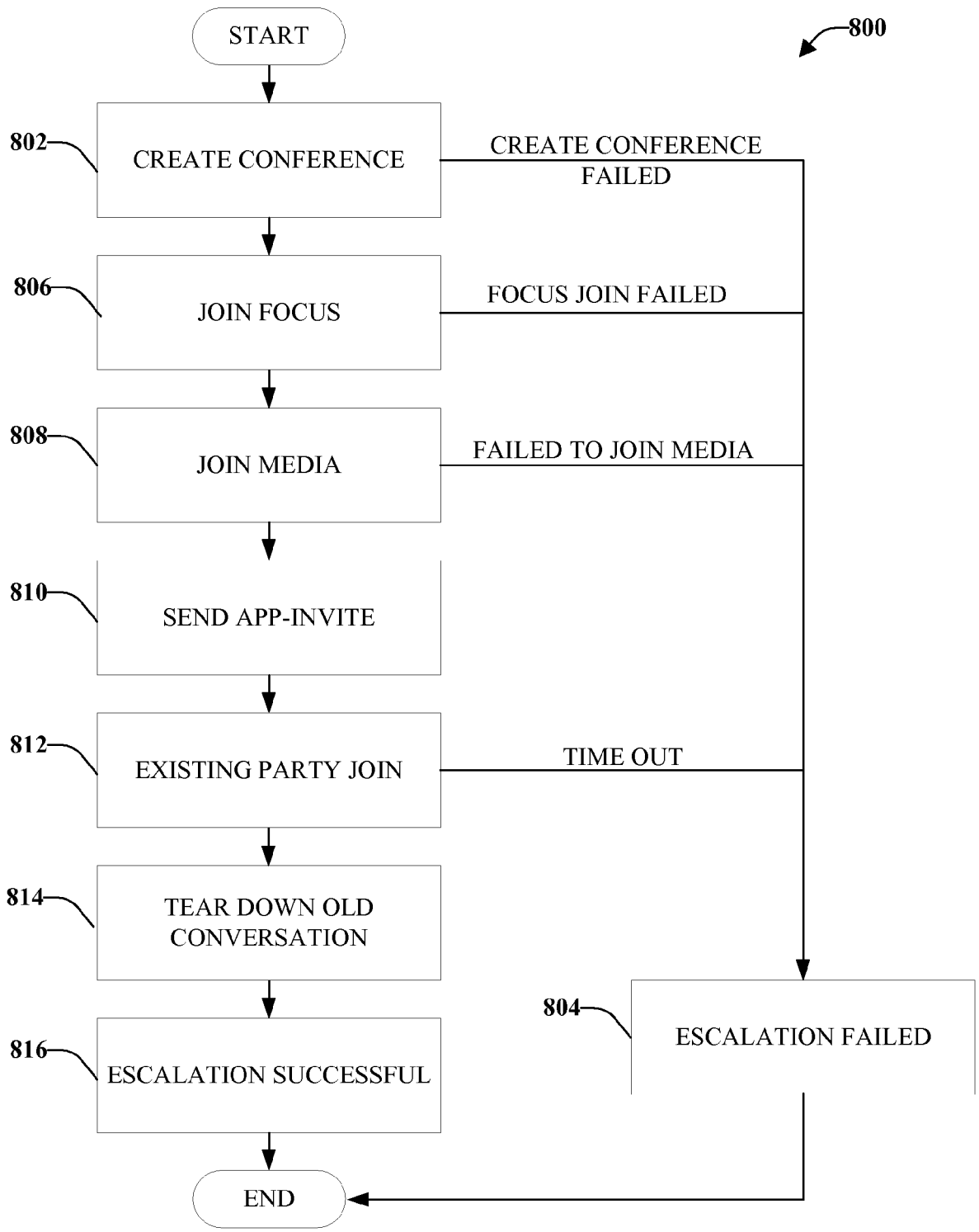
FIG. 8 illustrates a methodology for initiator failures during escalation from a conversation to a conference.

FIG. 8 illustrates a methodology 800 for initiator failures during escalation from a conversation to a conference. Method 800 starts at 802 where a conference is created, such as by calling into a web service to add a new participants, who are added to a roster. An attempt to create an ad-hoc conference is made. If the conference creation fails, method continues, at 804, with failure of the escalation. The new participant is removed from the initiator's roster and the previous peer-to-peer conversation continues. The existing party sees no change in the conversation.

If the conference is created, the method 800 continues, at 806, when the initiator joins the focus. After creating an ad-hoc conference, the initiator attempts to be added to the focus by sending a join INVITE. If there is a failure, the focus times out (according to a predetermined interval) and an error is reported to the initiator. The initiator can clean up the conference start by sending an INFO with deleteConference to the focus. The focus can verify if the MCU for this conference is in its records and delete the MCU if it is included. The focus can delete the conference and send the initiator a join BYE. The escalation fails, at 804, and the peer-to-peer conversation continues with the existing party detecting no changes in the conversation.

The method 800 can continue, at 808, where the initiator attempts to join the media, such as by performing a self dial out or by media Invite. If a failure occurs, the error is reported to the initiator and the conference state is cleaned up by sending a deleteConference to the focus. The focus can delete the conference and send a join BYE to the initiator and receive a BYE from the initiator in reply. The escalation fails, at 804, and the existing party detects no changes while the peer-to-peer conversation continues.

If the initiator joins the media successfully, the method 800 continues, at 810 where an app-INVITE is sent and the existing party can join at 812. The roster can be updated while waiting for the existing party to join. If a predetermined interval of time passes and the existing party has not joined, the escalation fails, at 804, and conference clean-up is conducted. If the existing party has joined, the peer-to-peer conversation is destroyed, at 814, resulting in successfully escalation, at 816. Additional parties can now be added to the focus.

Figure 9:
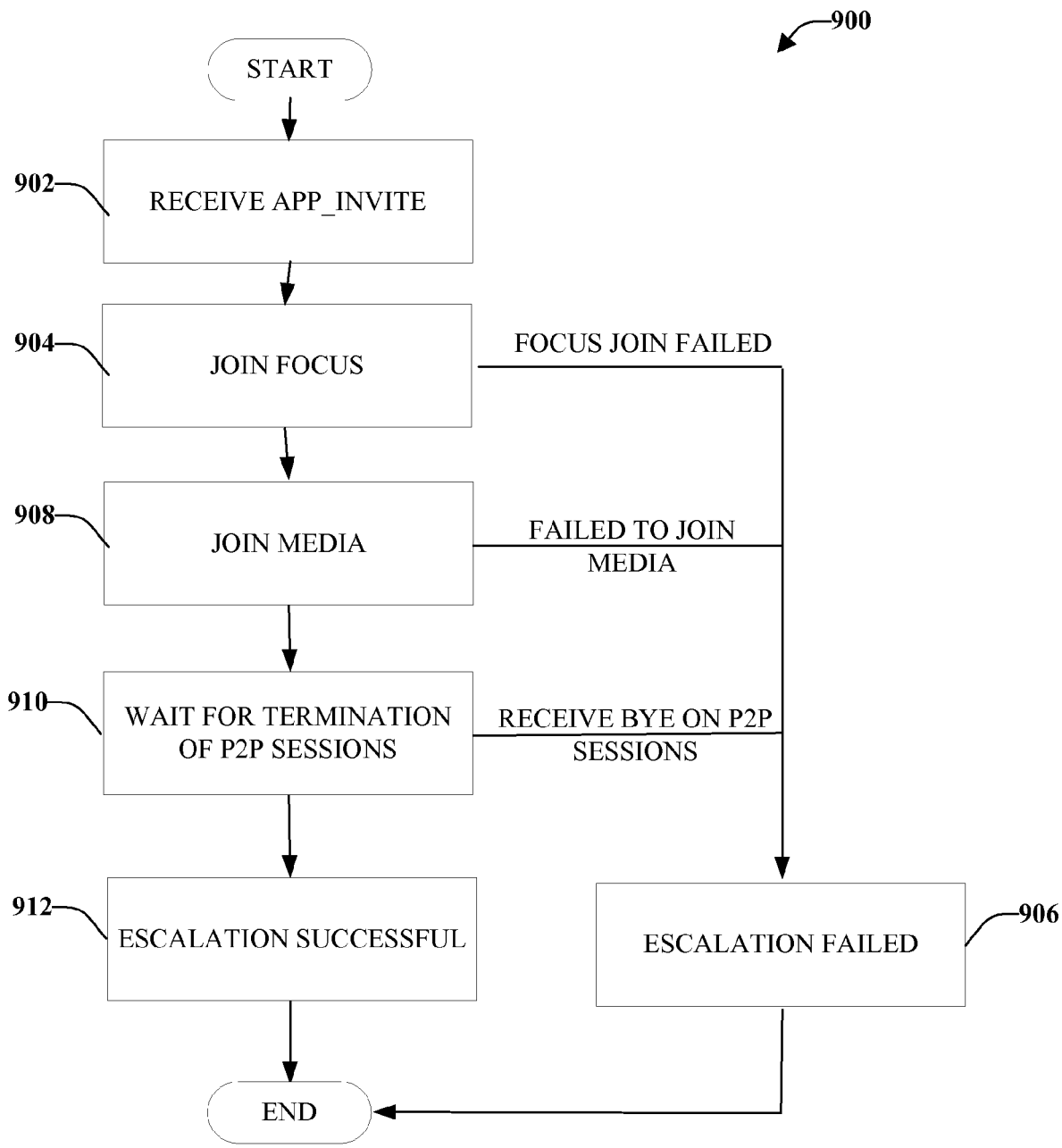
FIG. 9 illustrates a methodology for existing party failures during escalation from a conversation to a conference.

FIG. 9 illustrates a methodology 900 for existing party failures during escalation from a conversation to a conference. Method 900 starts, at 902, where an App_Invite is received. At 904, an attempt to join the existing party to the focus is made. If this attempt fails, the initiator times out because it did not receive a response from the existing party. The initiator cleans up the conference sate by sending a deleteConference to the focus. The focus deletes the conference and sends a C3P delete conference to the MCU. Each MCU sends a media BYE to the initiator and the focus sends a join BYE to the initiator. The escalation fails, at 906, and the peer-to-peer conversation continues.

If the existing party successfully joins the focus, an attempt to join the existing party to the media is made, at 908. If the existing party fails to join the media, the initiator times out because no response has been received from the existing party. The initiator sends a deleteConference to the focus and the existing party sends a BYE to the focus. The focus deletes the conference and sends a C3P delete conference to the MCUs. Each MCU sends a media BYE to the initiator. The focus sends a join BYE to the initiator and the existing party. The escalation fails, at 906, the existing party detects no change in the conversation and the peer-to-peer conversation continues.

If the existing party successfully joins the media, the method 900 continues, at 910, with waiting for the initiator to terminate the existing peer-to-peer session. Escalation is successful, at 912, if a BYE is received on the peer-to-peer sessions. If there is no BYE received and a predetermined interval of time has expired, escalation has failed, at 906, and the existing party is removed from the conference.

If the initiator and existing party have successfully joined the focus and media (peer-to-peer session has been torn down) and a new party fails to join a conference, the initiator and existing party continue the conversation through the focus. If the new party fails to join the media and the peer-to-peer session has been torn down, the new party sends a BYE to the focus.

Figure 10:
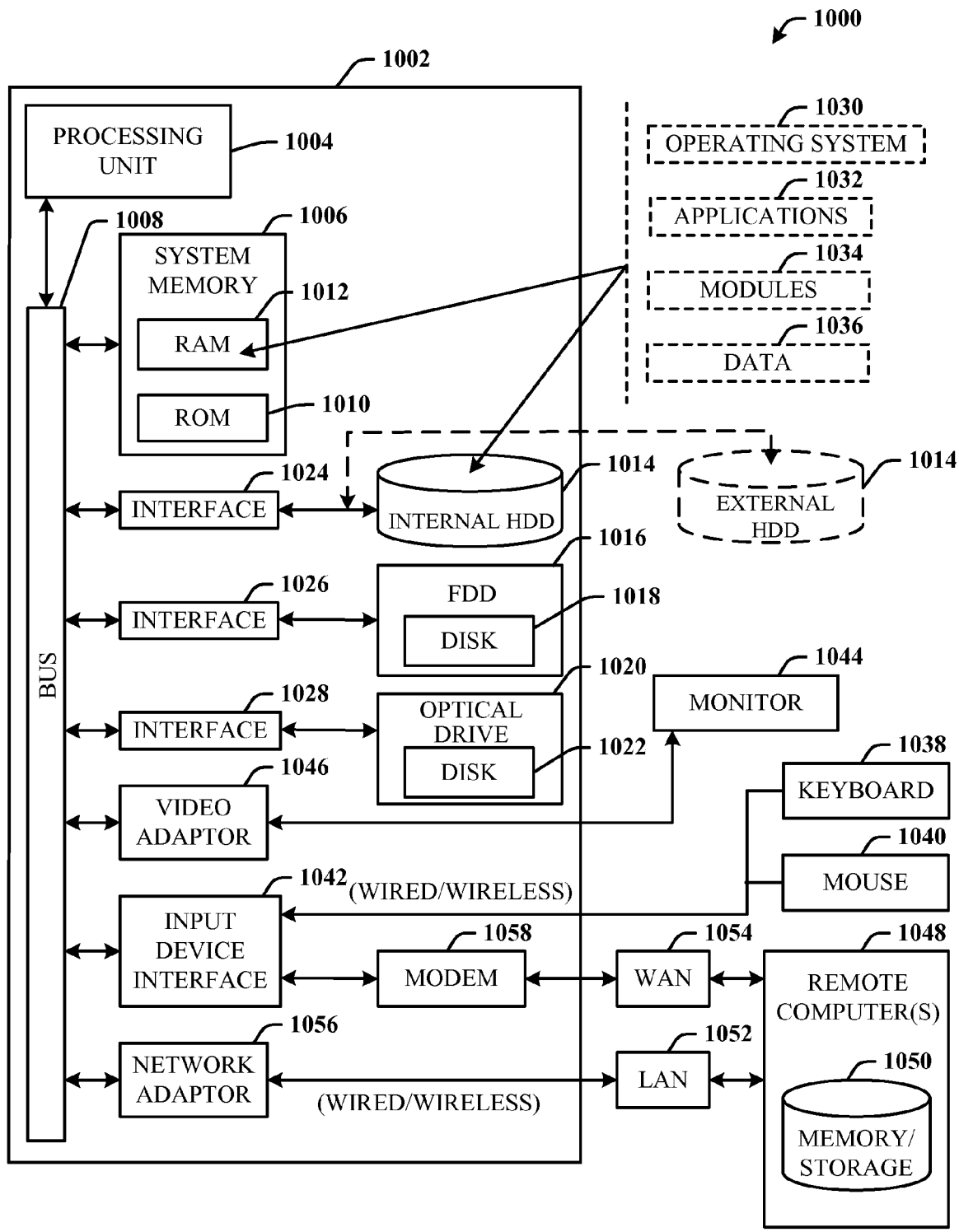
FIG. 10 illustrates a block diagram of a computer operable to execute the disclosed embodiments.

Referring now to FIG. 10, there is illustrated a block diagram of a computer operable to execute the disclosed architecture. In order to provide additional context for various aspects disclosed herein, FIG. 10 and the following discussion are intended to provide a brief, general description of a suitable computing environment 1000 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the various embodiments can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer typically includes other peripheral output devices (not shown), such as speakers, printers, etc.

The computer 1002 may operate in a networked environment using logical connections through wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
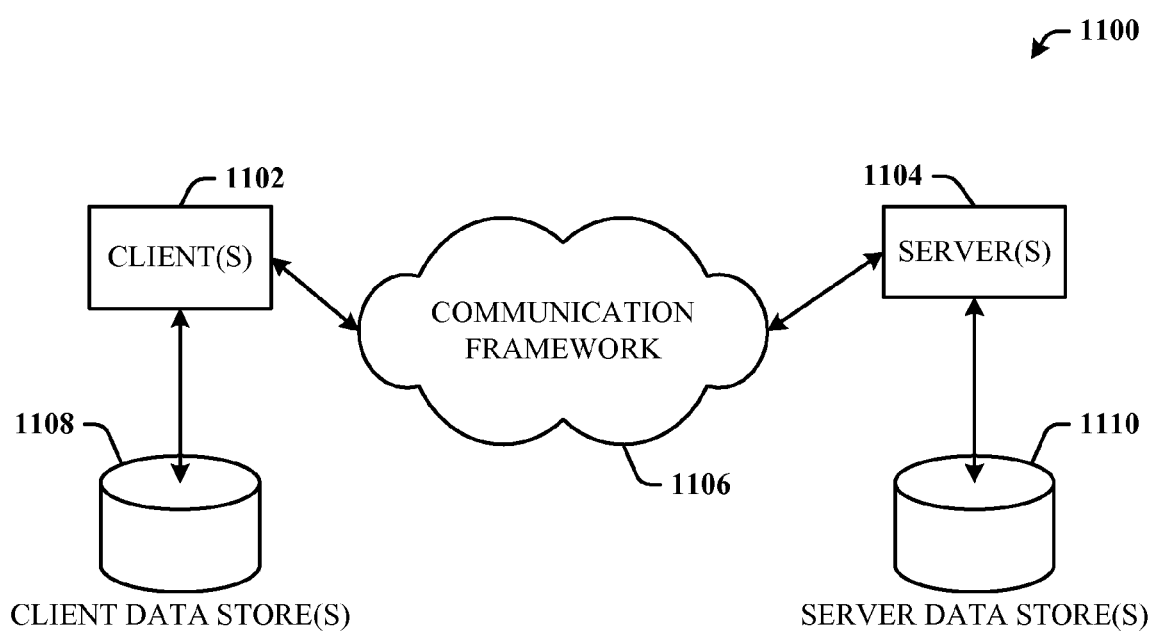
FIG. 11 illustrates a schematic block diagram of an exemplary computing environment operable to execute the disclosed embodiments.

Referring now to FIG. 11, there is illustrated a schematic block diagram of an exemplary computing environment 1100 in accordance with the various embodiments. The system 1100 includes one or more client(s) 1102. The client(s) 1102 can be hardware and/or software (e.g., threads, processes, computing devices). The client(s) 1102 can house cookie(s) and/or associated contextual information by employing the various embodiments, for example.

The system 1100 also includes one or more server(s) 1104. The server(s) 1104 can also be hardware and/or software (e.g., threads, processes, computing devices). The servers 1104 can house threads to perform transformations by employing the various embodiments, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated through a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system configured to facilitate escalating a peer-to-peer conversation to a conference between more than two parties, the system comprising:
   an interface component that receives information about at least one new participant to add to the peer-to-peer conversation, wherein the interface component displays a list of contacts that can be added to the peer-to-peer conversation as the at least one new participant;
   a communication component that communicates to a central focus a request that at least two existing parties of the peer-to-peer conversation be added to the central focus, the request being communicated in response to a decision by at least one of the at least two existing parties to escalate the peer-to-peer conversation to the conference, the central focus allowing the at least two existing parties to connect to a central conference manager that controls the conference; and
   a verification component that:
      verifies whether the at least two existing parties are joined to the central focus and verifies that the at least two existing parties are joined to at least one media through the central focus; and
      cancels the conference and reinstates the at least two existing parties to the peer-to-peer conversation, in response to the verification component determining that the at least two existing parties are not joined to the central focus,
      wherein the communication component also:
         outputs from the system to the at least one new participant an invitation to join the central focus in response to the verification component determining that the at least two existing parties are joined to the central focus;
         receives an acceptance from the at least one new participant in response to the at least one new participant joining the central focus; and
         sends a request to cancel adding the at least one new participant in response to the verification component determining that either of the at least two existing parties are not joined to the central focus.

2. The system of claim 1, wherein the interface component is updated with a status of the at least one new participant.

3. The system of claim 2, wherein the status includes at least one of an invitation status or a join status.

4. The system of claim 1, wherein the at least one media is Audio-visual Multipoint Control Unit (MCU) that controls Voice over Internet Protocol (VOIP) or video conferencing.

5. The system of claim 1, wherein the at least one media is an instant messenger Multipoint Control Unit (MCU).

6. A method for moving from a two-party conversation to a multi-party conference, wherein the two-party conversation is held between an initiator and an existing party, the method comprising:
   employing a processor to execute computer-executable instructions, that when executed by the processor, cause the processor to:
   receive a message from the initiator to send an invitation to a new party to join a focus and a Multipoint Control Unit (MCU), the focus allowing the initiator and the existing party to connect to the MCU;
   create the multi-party conference in response to receiving the message;
   send an invitation to the existing party to join the focus and the MCU;
   verify whether the initiator and the existing party joined the focus and the MCU;
   cancel the multi-party conference in response to the existing party or the initiator not joining the focus or the MCU;
   in response to the initiator and the existing party joining the focus and the MCU, send an invitation to the new party to join the focus and the MCU;
   in response to the new party joining the focus and the MCU, send a status update that the new party joined the focus and the MCU, the status update including at least one of a status of the invitation to the new party or a status of the new party joining the focus and the MCU;

in response to determining that either the existing party or the initiator are not joined to the focus and the MCU, send a request to cancel adding the new party; and in response to the initiator, the existing party or the new party failing to join the focus and the MCU, return the initiator and the existing party to the two-party conversation.

7. The method of claim 6, wherein canceling the multi-party conference includes:

tracking an interval of time after sending the existing party an invitation to join the focus and the MCU; and canceling the multi-party conference in response to the interval of time expiring before the existing party joins the focus and the MCU.

8. A computer-implemented system configured to provide a seamless escalation from a peer-to-peer conversation to a conference, the computer-implemented system comprising:

a server comprising a focus component and a Multipoint Control Unit (MCU) component, wherein the server:

identifies an initiator and an existing participant in the peer-to-peer conversation; and receives information regarding at least one new participant to add to the conversation, to escalate the peer-to-peer conversation to the conference, and wherein the focus component:

joins the initiator and the existing participant to a central conference manager that controls the conference;

initiates the initiator and the existing participant joining the MCU component;

detects whether either the initiator or the existing participant failed to join either the conference or the MCU component; and cancels the conference and reverts to the peer-to-peer conversation in response to either the initiator or the existing participant failing to join either the conference or the MCU, and wherein the initiator:

sends an invitation to the at least one new participant to join the MCU component in response to a determination by the focus component that the initiator and the existing participant are joined to the conference and the MCU; and sends a request to the focus component to cancel adding the at least one new participant in response to a determination by the focus component that either the initiator or the existing participant is not joined to the conference or the MCU component.

9. The computer-implemented system of claim 8, wherein the focus component also sends one or more updates to the initiator about the existing participant and the at least one new participant.

* * * * *

UNITED STATES PATENT AND TRADEMARK OFFICE
CERTIFICATE OF CORRECTION

| | |
|---|---|
| PATENT NO. | : 7,760,865 B2 |
| APPLICATION NO. | : 11/561008 |
| DATED | : July 20, 2010 |
| INVENTOR(S) | : Muhammad Aatif Awan et al. |

It is certified that error appears in the above-identified patent and that said Letters Patent is hereby corrected as shown below:

In column 16, line 40, in Claim 4, delete "VOIP" and insert -- VoIP --, therefor.

Signed and Sealed this
Fifteenth Day of March, 2011

David J. Kappos
*Director of the United States Patent and Trademark Office*